Sept. 25, 1956

D. G. SCORGIE 2,764,723

MAGNETIC SERVO AMPLIFIER

Filed Dec. 1, 1953

2 Sheets-Sheet 1

INVENTOR
DONALD G. SCORGIE

BY D. C. Snyder
Howard White
ATTORNEYS

Sept. 25, 1956 D. G. SCORGIE 2,764,723

MAGNETIC SERVO AMPLIFIER

Filed Dec. 1, 1953 2 Sheets-Sheet 2

INVENTOR
DONALD G. SCORGIE

BY D. G. Snyder
Howard White
ATTORNEYS

United States Patent Office 2,764,723

Patented Sept. 25, 1956

2,764,723

MAGNETIC SERVO AMPLIFIER

Donald G. Scorgie, Forestville, Md., assignor to the United States of America as represented by the Secretary of the Navy

Application December 1, 1953, Serial No. 395,627

9 Claims. (Cl. 318—207)

(Granted under Title 35, U. S. Code (1952), sec. 266)

This invention relates to magnetic servo amplifiers and more particularly to alternating voltage magnetic servo amplifiers utilizing saturable core reactors, of the type wherein the time integral of voltage of a voltage pulse derived from the amplifier on any given half cycle of operation is determined by the level of magnetization set in the core on the immediately preceding half cycle of operation.

In the article "Half wave magnetic amplifiers," by C. W. Lufcy et al., in Electronics of August 1952, at pages 124 and 125 there is disclosed a servo amplifier making use of magnetic amplifiers of the "reset" type described by R. A. Ramey in the article on "The mechanics of magnetic amplifiers" appearing in "Transactions of the A. I. E. E.," volume 70, part II, pages 1214–1223. The amplifier described by Lufcy et al. suffers from the limitation that there is no voltage present across the variable phase of the two phase motor controlled thereby when the control signal applied to the amplifier is of zero amplitude. As a result, the motor or other device controlled by the servo amplifier is subject to oscillation, inasmuch as there is no signal that will brake the motor and thereby damp oscillations when the system or device controlling the magnetic servo amplifier approaches balanced conditions.

Additionally, under certain conditions of operation, it is desirable to increase the power gain obtainable from a magnetic amplifier of the reset type without increasing the response time thereof. Heretofore, increased power gain has been obtained by the expedient of connecting reset amplifiers in tandem, as a result the response time of the system obtained thereby has been considerably increased.

Accordingly, one object of the present invention is to provide a magnetic servo amplifier having a braking component in the output signal derived therefrom such as will be effective to damp oscillations of the device controlled thereby.

Another object of this invention is to provide a means for effecting increased gain from a reset-type magnetic amplifier without increasing the response time thereof.

Other objects and features of the present invention will become apparent upon consideration of the following detailed description when taken in connection with the accompanying drawings which illustrate various embodiments of the invention. It is to be expressly understood, however, that the drawings are designed for purposes of illustration only and not as a definition of the limits of the invention, reference for the latter purpose being had to the appended claims.

Figure 1 is a schematic diagram of one embodiment of my invention.

Figures 2*a*, 2*b* and 2*c* are waveform representations of the output voltages derived from the embodiment of my invention shown in Figure 1, which representations are useful in understanding the operation of my invention.

Figure 1:
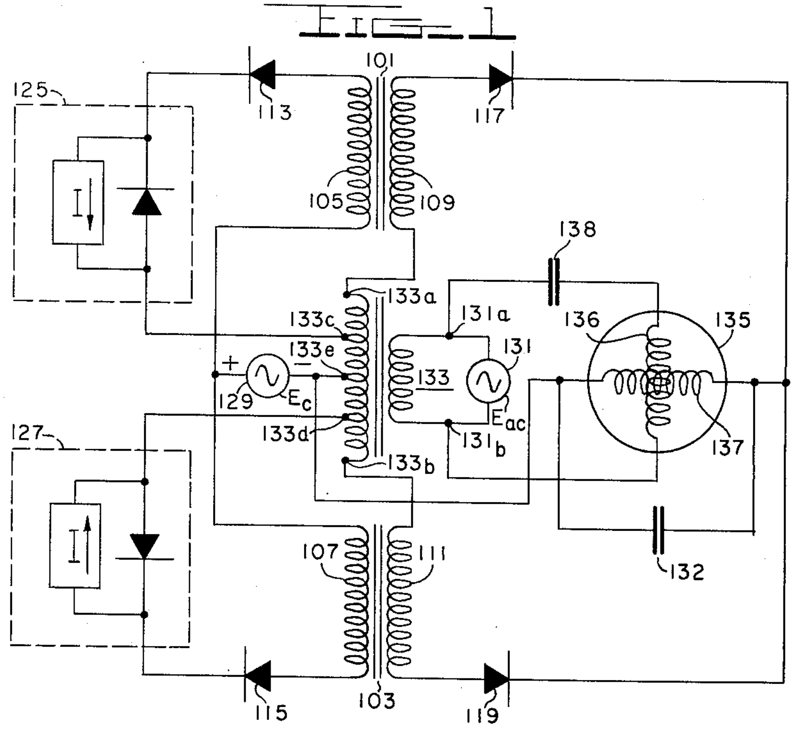

The basic magnetic amplifier utilized by the present invention and described in the aforementioned article by R. A. Ramey makes use of a high remanence, saturable core member having wound thereon a control winding and a load winding. An alternating voltage source is coupled to these windings by means of rectifiers, which rectifiers are poled so that on first alternate half cycles of the alternating voltage, a voltage is applied to the load winding to drive the magnetization level of the reactor toward saturation, and on second alternate half cycles of the alternating voltage a voltage is applied to the control winding to "reset" or withdraw the magnetization level of the reactor from saturation. A control voltage or other control element is connected in series with the alternating voltage source and the control winding to control the magnetization level set by the control winding on reset half cycles of operation. After the saturable core has become saturated during the half cycle of voltage application to the load winding, the impedance presented thereby will drop from a very high value to a very low value and the voltage across a load impedance connected in series with the load winding will sharply rise to substantially the same voltage as that of the alternating voltage source. The time integral of voltage developed across the load impedance, therefore, will be determined by the magnetization level set in the core during the half cycle of voltage application to the control winding. Inasmuch as this magnetization level is a function of the control voltage in series with the control winding, the time integral of voltage developed across the load impedance will be functionally related to the control voltage applied to the control winding.

In my invention, I make use of two such magnetic amplifiers connected in push-pull with the output circuits thereof being connected in parallel across the control phase of a two phase motor. Voltage pulses of the same polarity are derived from one amplifier on first alternate half cycles of operation, and from the other amplifier on second alternate half cycles of operation. The alternating voltage source coupled to the magnetic amplifiers is arranged so that the voltage applied to the load windings is of larger amplitude than the reset voltage applied to the control windings so that output pulses will be present across the control phase of the motor even when no control signal is applied to the control winding of either amplifier. Under such circumstances (no control voltage) the output pulses will be of equal amplitude and will contain only a D. C. component and harmonic components of the second order and higher; no fundamental component will be present such as will cause rotation of the motor rotor. (By fundamental component is meant a component of the same frequency as that of the alternating voltage source.)

By using the control voltage to effect a differential withdrawal of the cores from saturation on their respective reset half cycles of operation, the number of volt-seconds in the output pulses derived from one amplifier is made greater than the number of volt-seconds in the output pulses derived from the other amplifier. Thereupon, there will appear across the control phase of the motor a component of fundamental frequency, which component will cause rotation of the motor in a direction dependent on the phase of the fundamental component relative to the alternating voltage applied across the fixed phase of the motor. The phase of this fundamental component and the direction of motor rotation can be reversed by simply reversing the polarity of the control voltage and hence the relative magnetization levels to which the cores are withdrawn on their respective half cycles of operation.

Referring now to Figure 1, wherein there is shown one embodiment of my invention, reference numerals 101 and 103 designate high remanence, saturable cores preferably of the type having "square loop" hysteresis curves. On saturable core 101 are wound control winding 105 and load winding 109 and on saturable core 103 are wound control winding 107 and load winding 111. A source of alternating voltage 131, usually of power line frequencies, is coupled in a balanced push-pull relationship to the load windings 109 and 111 by means of the center-tapped secondary winding of transformer 133. Load winding 109 is coupled to high voltage terminal 133*a* of the transformer and load winding 111 is coupled to the high voltage terminal 133*b*, the voltage at the latter terminal being equal to but in phase opposition with that at terminal 133*a*. The control phase 137 of a two phase motor 135 provides the load impedance for the amplifiers 101 and 103, and has one end connected to the center-tap 133*e* of the output winding of transformer 133. The other end of control phase 137 is coupled to load winding 109 of amplifier 101 by means of half wave rectifier 117 and to load winding 111 of amplifier 103 by means of half wave rectifier 119. Rectifiers 117 and 119 are poled so as to oppose current flow from the control phase of the motor to the load windings. The fixed phase 136 of the motor is connected directly across alternating voltage source 131 at the terminals 131*a* and 131*b* thereof. For purposes of providing resetting voltages to cores 101 and 103, the control windings 105 and 107 are also connected in balanced push-pull relationship to transformer 133. In this connection one end of control winding 105 is coupled to low voltage terminal 133*c* of transformer 133 by means of the series connected half wave rectifier 113 and current limiting device 125. The other end of control winding 105 is coupled to the center-tap of transformer 133 by means of a source of alternating control voltage 129. Similarly, control winding 107 is coupled to the oppositely phased low voltage terminal 133*d* by means of series connected current limiting device 127 and half wave rectifier 115. The voltages appearing at taps 133*c* and 133*d* are equal but opposite in phase. Current limiting devices 125 and 127 conveniently may comprise constant current sources shunted by rectifiers as described in detail with reference to Figure 4; the function of the current limiting devices is to limit the current flowing through the control windings to which they are coupled to the magnetization current of the saturable cores.

Control voltage source 129 is of the same frequency as source 131 but usually much smaller in amplitude, and is selectively either of the same phase as source 131 or of the opposite phase. In follow up applications, control voltage source 129 may correspond to the error voltage of the system, or alternatively in simple control applications this voltage may be selectively introduced in any convenient manner by the operator. For example, a control transformer such as is shown at page 82 of Theory of Servomechanisms by James, Nichols and Philips, volume X of the MIT Radiation Laboratory Series (1948), may be used.

As will be gleaned from the various connections recited above, load rectifiers 117 and 119 and control rectifiers 113 and 115 are poled so as to permit the application of voltage from source 131 to the control windings 105 and 107 and load windings 109 and 111 in half cycle alternation in such a manner that during one half cycle of source 131, voltage is simultaneously applied to the load winding of one of the cores 101 or 103 and to be control winding of the other core with this application of voltage reversing each half cycle of the source 131. In this way an output voltage is derived from one core during one half cycle of the source 131 while the other core is being reset. Then in the next half cycle of the source 131, output voltage is derived from the other core while the said one core is being reset.

The operation of the embodiment shown in Figure 1 will now be set forth with reference to the waveform representations of Figures 2*a*, 2*b* and 2*c*. Assuming first that the output of control voltage source 129 is zero (that is, that no voltage is present across the terminals thereof), it can be seen that the reset voltages applied to the control windings 105 and 107 on alternate half cycles of operation by taps 133*c* and 133*d* will be equal and saturable cores 101 and 103 will be equally withdrawn from saturation on their respective reset half cycles of operation. In this condition since the reset voltages applied to the control windings 105 and 107 by the taps 133*c* and 133*d* in less than the load voltages applied to the load windings from taps 133*a* and 133*b*, output voltage pulses of the same polarity having equal half cycle time integrals will appear across variable phase 137. More particularly, during the half cycle of operation when high voltage terminal 133*a* is positive with respect to terminal 133*b*, rectifier 119 will prevent current from flowing through load winding 111, but current will flow through load winding 109, rectifier 117, and variable phase 137. This current will be limited to the magnetizing current of core 101 until saturation thereof. Thereafter the current will be limited only by the reactance of variable phase 137, the relatively low reactance of load winding 109 and the forward resistance of rectifier 117; the result is that a voltage pulse of substantially the same amplitude as that between center-tap 133*e* and terminal 133*a* will appear across the variable phase 137 after saturation of core 101 inasmuch as the reactance of variable phase 137 will then be high compared to the reactance of the rest of the components in the loop.

On half cycles of operation when terminal 133*b* is positive with respect to the center-tap, rectifier 119 permits current to flow through load winding 111 and variable phase 137 but half wave rectifier 117 will now prevent current from flowing through the loop including load winding 109 and variable phase 137. Therefore, on each half cycle of voltage 131, current flows through variable phase 137 always in the same direction and voltage pulses appearing thereacross are of the same polarity and time integral.

Figure 2:
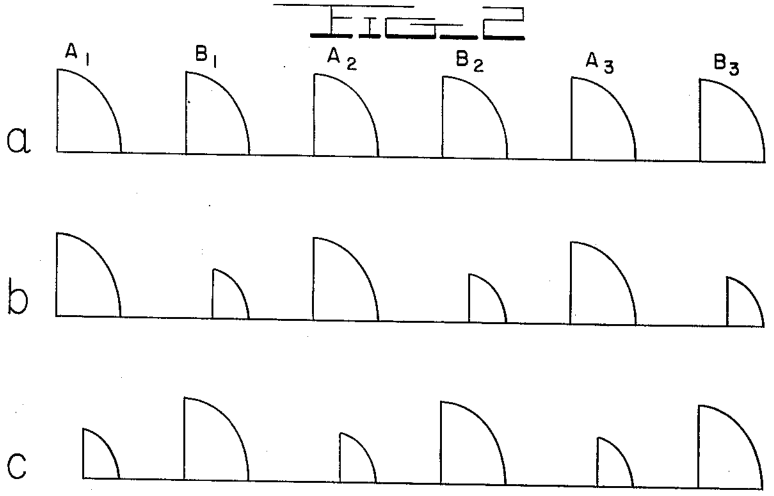

It is readily apparent that voltage pulses such as are depicted in Figure 2*a* will appear across variable phase 137. Pulses A1, A2, A3, etc., are derived from terminal 133*a* and load winding 109, and pulses B1, B2, B3, etc., are derived from terminal 133*b* and load winding 111. A Fourier analysis of this train of voltage pulses will show that a D. C. component is present, along with component having second and higher harmonics of the frequency of source 131.

Assume now that an alternating control voltage $E_c$ which is preferably small relative to the voltage appearing at taps 133*c* and 133*d* is introduced into the system from control voltage source 129 and that this voltage has a relative phase with respect to the voltage across the secondary of transformer 133 such as is indicated by the instantaneous half cycle polarity designations shown in Figure 1. $E_c$ effectively will be in phase with the voltage between the center-tap and terminal 133*d* and will be in phase opposition to the voltage between the center-tap and terminal 133*c*. During the half cycle of applied voltage when the voltage at 133*c* is positive with respect to that at 133*d*, there will be no current flow in the loop including control winding 105 due to rectifier 113, but rectifier 115 will permit current to flow in the loop including control winding 107. The voltage that withdraws core 103 from saturation, therefore, will be equal to the sum of $E_c$ and the voltage between center-tap and terminal 133*d*. On the next half cycle of operation, while core 103 is being driven to saturation by the application of voltage to the load winding, core 101 is being withdrawn from saturation by the application of voltage to the control winding 105. The voltage that withdraws core 101 from saturation will be equal to the difference between the $E_c$ and the voltage between center-tap and terminal 133*c*. Therefore on their respective half cycles of operation, core 101 will be withdrawn from saturation to a lesser extent than will core 103. During half cycles of operation when cores 101 and 103 are being driven to saturation the half cycle voltage integral of voltage pulses derived from terminal 133a and load winding 109 will be larger than will be the half cycle voltage integral of pulses derived from terminal 133b and winding 111, inasmuch as core 101 is at a higher magnetization level at the end of its reset half cycle of operation than is core 103 at the end of its reset half cycle of operation. Therefore, pulses such as are shown in Figure 2*b* will appear across variable phase 137. A Fourier analysis of this train of pulses will show that there is present a D. C. component, components of second harmonic frequency, and also a component of fundamental frequency. This fundamental component is approximately 90° out of phase with the voltage across fixed phase 135. In order to bring the voltage across the two phases more exactly in phase-quadrature, condenser 138 is connected in series with fixed phase 136.

For unity turns ratio between the control and load windings on cores 101 and 103, $E_c$ should not exceed the difference between the load and reset voltage applied to the cores by source 131.

In order to reverse the phase of the fundamental component across variable phase 137, it is only necessary to reverse the phase of control voltage $E_c$. Then in this condition on reset half cycles of operation, core 101 will be withdrawn further from saturation than core 103, and voltage pulses having a larger half cycle voltage integral will be derived from terminal 133b and load winding 111 than from terminal 133a and load winding 109. The train of voltage pulses that will appear across variable phase 137 will then be as shown in Figure 2*c*. The fundamental component of this train of voltage pulses is in phase opposition to that of the fundamental component of the voltage pulses derived as described above and the direction of motor rotation will be reversed.

As mentioned previously, the function of current limiting devices 125 and 127 is to limit the current flowing through the control windings on reset half cycles of operation to the magnetization current of the core should the control voltage exceed the difference between the load and reset voltages applied to the cores by source 131. When the control voltage $E_c$ and either the voltage between 133c and center-tap 133e or the voltage between 133d and center-tap 133e are additive, there is a possibility, if the control voltage $E_c$ is greater than the difference voltage mentioned above that one of the cores may become saturated in the direction opposite to the sense of saturation produced by the load voltage. Under such conditions the impedance offered to the flow of current by a control winding would suddenly drop to a very low value and a short circuit would exist in the loop including that control winding, which could easily damage the winding. The constant current sources 125 and 127 eliminate the possibility of such a situation arising, inasmuch as the current limiting devices are set so that the current through the control windings cannot exceed the saturating current of the core.

Figure 3:
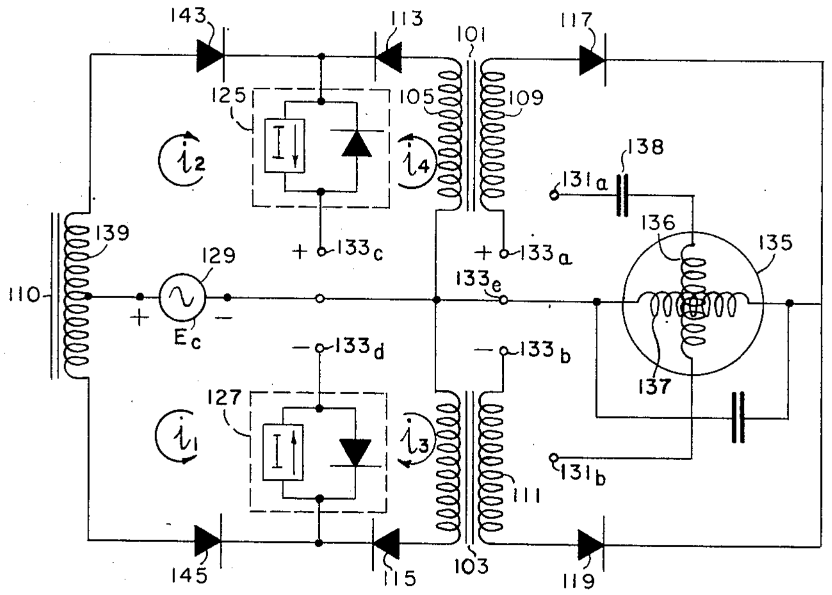
Figure 3 is a schematic diagram showing another embodiment of my invention.

In Figure 3 there is shown an embodiment of my invention that offers greater gain than the embodiment shown in Figure 1 without increasing the response time thereof, and isolates the control signal $E_c$ from currents flowing in the control winding of the saturated cores. This embodiment differs from that shown in Figure 1 primarily in that the source of control voltage 129 is no longer connected between the center-tap 133e and the juncture of control windings 105 and 107. Instead, source 129 is connected between the center-tap 133e and the center-tap of winding 139 and an auto-transformer 142. The terminals of the winding 139 are respectively coupled to the juncture of current limiting device 125 and rectifier 113 by rectifier 143 and to the juncture of current limiting device 127 and rectifier 115 by rectifier 145. Transformer 133 is not shown, it being understood that the transformer is connected as before with the terminals thereof being numbered the same as in Figure 1. The load circuit of the embodiment shown in Figure 3 is the same as shown in Figure 1.

Figure 4:
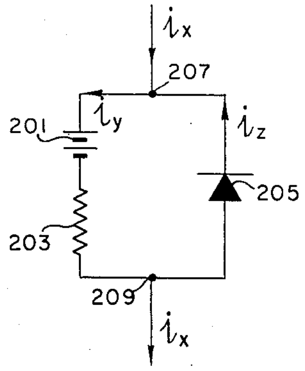
Figure 4 is a schematic diagram of a current limiting device which forms an element of my invention.

The current limiting devices 125 and 127 are typically as described with reference to Figure 4, and each is set to pass only very slightly more current than the sum of the magnetizing current of the saturable core coupled thereto and the magnetizing current requirement of half of winding 139.

More particularly, the current limiting devices 125 and 127 include, in a typical case, a source of D. C. potential, 201, typically a battery connected in series with a high resistance 203. This combination is effectively a source of constant current. Battery 201 is connected to terminal 207 and resistance 203 to terminal 209. Rectifier 205, which may be a germanium or selenium diode, is also connected between terminals 207 and 209 polarized to complete the circuit for battery 201 and to pass current from terminal 209 to terminal 207. As thus connected the current $i_y$ flowing through the circuit leg including battery 201 and resistance 203 is held constant and any current $i_x$ flowing into terminal 207 from an external source (not shown) will add with the current $i_z$ flowing through diode 205 due to battery 201 to produce current $i_y$ through the constant current source. When $i_x$ is zero, $i_y$ will equal $i_z$ and the magnitude thereof will equal the constant current output of battery 201 and resistance 203. No voltage will exist across terminals 207 and 209. However, when $i_x$ increases to a given value less than the constant current output of battery 201, there will be a corresponding decrease in $i_z$ so that $i_y$ will remain constant, and again there will be no voltage across terminals 207 and 209. Whenever $i_x$ attempts to rise above the constant current output of battery 201 and resistance 203, a voltage will appear between terminals 207 and 209 to block the attempted increase, and no current will flow through rectifier 205.

Returning now to Figure 3, on first alternate half cycles of operation when the output of alternating voltage source 131 is as shown, with terminals 133a and 133c respectively positive with respect to terminals 133b and 133d, the amplifier including core 101 will be on its load half cycle of operation and the amplifier including core 103 will be on its reset half cycle of operation. Rectifier 113 will prevent current from flowing in the loop including control winding 105 and current limiting device 125, but reset current $i_3$ will flow in the loop including current limiter 127 and control winding 107 in the direction indicated by current vector $i_3$.

Since, as previously mentioned, the current limiters 125 and 127 in Figure 3 are set to pass currents at least equal to the sum of the magnetizing currents of the magnetic amplifier 101 or 103 and transformer 140 before they become blocked, and since rectifier 113 prevents magnetizing current from flowing through winding 105 during the assumed half cycle, it will be apparent that current limiters 125 and 127 are both initially unblocked when $E_{ac}$ and $E_c$ are zero but as $E_c$ and $E_{ac}$ rise from zero with the polarity indicated limiter 127 becomes blocked and limiter 125 remains unblocked.

In more particular the voltage $E_{ac}$ between terminals 133d and 133e is in phase with $E_c$ and the sum of these voltages have the polarity to cause conduction in rectifier 145 thereby causing current $i_1$ to flow through the auto-transformer 140. Concomitant with the flow of current $i_1$ through the lower half of transformer 140, a voltage in phase with $E_c$ is induced in the upper half of transformer 140. This voltage will produce conduction in rectifier 143 when it equals or tends to exceed the difference in voltages between the center-tap of transformer 140 and terminal 133c, that is when the induced voltage equal $E_{ac}-E_c$. This induced voltage which is caused by the application of $E_{ac}+E_c$ to the lower half of the transformer equals $E_{ac}-E_c$ essentially instantaneously to thereby cause a current $i_2$ to flow through rectifier 143. This current, of course, must be supplied from the primary energizing current $i_1$. Current $i_1$ flowing through limiter 127 in the presence of $i_3$ flowing through limiter 127 can only exceed the magnetizing current of transformer 140 by a small amount as set by limiter 127. Consequently, with the advent of current $i_2$, limiter 127 becomes blocked and limiter 125 which only has to carry current $i_2$ remains unblocked since $i_2$ must equal the difference between $i_1$ and the magnetizing current $i_c$ of transformer 140. Now then since rectifier 143 is conducting and limiter 125 is unblocked the induced voltage across the upper half of the transformer 140 is clamped at $E_{ac}-E_c$ and likewise the counter E. M. F. developed across the lower half of transformer 140 is also clamped at $E_{ac}-E_c$.

Accordingly, the control voltage $E'_c$ appearing across the blocked limiter 127 will be equal to the difference between the applied voltage between terminal 133d and the center-tap of transformer 138 ($E_{ac}+E_c$) and the counter E. M. F. voltage ($E_{ac}-E_c$) developed across the lower half of the transformer.

$$\text{Thus } E'_c=(E_{ac}+E_c)-(E_{ac}-E_c)=2E_c$$

On second alternate half cycles of operation the relative polarities of the voltages will be the opposite of those shown in Figure 3. Under this condition $i_1$ and $i_3$ will equal zero, $i_4$ will equal the magnetizing current of core 101, and $i_2$ will be equal to the magnetizing current of choke 140. The current passed by limiter 125 is limited to a value only slightly greater than the sum of the magnetizing currents of chokes 101 and 140, limiter 125 will remain unblocked and no voltage will appear thereacross.

By a similar analysis it may be shown that reversing the phase of $E_c$ relative to $E_{ac}$ will cause a voltage equal to $2E_c$ to appear across limiter 125 on second alternate half cycles of operation corresponding to the reset half cycles of the amplifier including core 101, and that no voltage at all will appear across limiter 127.

The effect of a voltage appearing across either current limiter 125 or 127 on a given reset half cycle of operation of the magnetic amplifier to which it is coupled is to lessen the withdrawal from saturation of the saturable core in that magnetic amplifier and to correspondingly increase the voltage-integral in the output pulse derived therefrom on the next half cycle. As such voltages appear across only one current limiter for a given phase relation between $E_c$ and $E_{ac}$, the magnetic amplifiers will be differentially withdrawn from saturation on their succeeding reset half cycles of operation, and voltage pulses having different voltage-integrals will be derived therefrom on forward half cycles of operation, with a phase reversal of the fundamental component contained therein as described above with reference to Figure 1.

In the embodiment shown in Figure 3 the reset current passing through control windings 105 and 107 does not traverse control signal source 129. The current through source 129 is limited by the impedance of winding 139, which impedance may be made very high. Therefore, only a relatively small amount of power need be delivered by source 129 and a considerable increase in power gain is effected over that obtainable by the embodiment shown in Figure 1. Additionally, the signal source is isolated from effects produced by variations in the load 137 by the embodiment of Figure 3.

There has been produced by my invention a reset type magnetic servo amplifier having a D. C. component in the output that is operable to damp oscillations of a split phase motor controlled by the servo amplifier. Additionally, the invention makes possible a considerable increase in gain without increasing the response time of the servo amplifier.

Having described the principle of the invention and the best mode in which I have contemplated applying that principle, I wish it to be understood that the apparatus described is illustrative only, and that other means can be employed without departing from the true scope of the invention defined in the following claims.

The invention described herein may be manufactured and used by or for the Government of the United States of America for governmental purposes without the payment of any royalties thereon or therefor.

What is claimed is:

1. A magnetic amplifier comprising first and second saturable core members each having a control winding and a load winding thereon, first alternating voltage supply means unilaterally coupled in phase opposition to the load windings of the cores to drive said cores to saturation in alternation in successive half cycles of the first voltage, a load circuit energized by the load windings, second alternating voltage supply means synchronous with the first supply means unilaterally coupled in inverse phase to the control windings to demagnetize the cores in successive half cycles of the second voltage in opposed alternation to saturation thereof by the load windings, and control means for varying the demagnetizing current applied to the control windings.

2. A magnetic amplifier comprising first and second saturable core members each having a control winding and a load winding thereon, first alternating voltage supply means unilaterally coupled in phase opposition to the load windings of the cores to drive said cores to saturation in alternation in successive half cycles of the first voltage, a load circuit energized by the load windings, second alternating voltage supply means synchronous with the first supply means unilaterally coupled in inverse phase to the control windings to demagnetize the cores in successive half cycles of the second voltage in opposed alternation to saturation thereof by the load windings, and control means operative to vary the amplitude ratio of the demagnetizing voltages applied to the control windings.

3. A magnetic amplifier comprising first and second saturable core members each having a control winding and a load winding thereon, first alternating voltage supply means unilaterally coupled in phase opposition to the load windings of the cores to drive said cores to saturation in alternation in successive half cycles of the first voltage, a load circuit energized by the load windings, second alternating voltage supply means synchronous with the first supply means unilaterally coupled in inverse phase to the control windings to demagnetize the cores in successive half cycles of the second voltage in opposed alternation to saturation thereof by the load windings, and control means comprising a third synchronous voltage source of variable amplitude and reversible phase connected in series between the second voltage supply and the control windings.

4. A magnetic amplifier comprising first and second saturable core members each having a control winding and a load winding thereon, a two phase motor having a pair of motor windings, first alternating voltage supply means unilaterally coupled in phase opposition to the load windings of the cores to drive said cores to saturation in alternation in successive half cycles of the first voltage, means coupling the load windings to one of the motor windings, synchronous means for energizing the other motor winding, second alternating voltage supply means synchronous with the first supply means unilaterally coupled in inverse phase to the control windings to demagnetize the cores in successive half cycles of the second voltage in opposed alternation to saturation thereof by the load windings, and control means for varying the demagnetizing current applied to the control windings.

5. A magnetic amplifier comprising first and second saturable core members each having a control winding and a load winding thereon, first alternating voltage supply means unilaterally coupled in phase opposition to the load windings of the cores to drive said cores to saturation in alternation in successive half cycles of the first voltage, a load circuit energized by the load windings, second alternating voltage supply means synchronous with the first supply means, unilaterally conductive current limiting means coupling the second voltage supply means to the control windings in inverse phase to demagnetize the cores in successive half cycles of the second voltage in opposed alternation to saturation thereof by the load windings, and control means for varying the demagnetizing current applied to the control windings.

6. A magnetic amplifier comprising first and second saturable core members each having a control winding and a load winding thereon, first alternating voltage supply means unilaterally coupled in phase opposition to the load windings of the cores to drive said cores to saturation in alternation in successive half cycles of the first voltage, a load circuit energized by the load windings, second alternating voltage supply means synchronous with the first supply means unilaterally coupled in inverse phase to the control windings to demagnetize the cores in successive half cycles of the second voltage in opposed alternation to saturation thereof by the load windings, control means for varying the demagnetizing current applied to the control windings, and current limiting means connected in series with each control winding operative to limit its demagnetizing current flow to substantially the magnetization current of its core.

7. A magnetic amplifier comprising first and second saturable core members each having a control winding and a load winding thereon, first alternating voltage supply means unilaterally coupled in phase opposition to the load windings of the cores to drive said cores to saturation in alternation in successive half cycles of the first voltage, a load circuit energized by the load windings, second alternating voltage supply means synchronous with the first supply means, current limiting means driven in inverse phase by the second alternating voltage supply means having output terminals, means unilaterally coupling the said output terminals to the control windings in phase opposition to demagnetize the cores in successive half cycles of the second voltage in opposed alternation to saturation thereof by the load windings, control means comprising a synchronous voltage source of variable amplitude and reversible phase coupled to the second voltage supply and unilateral means connected between the control means and the said output terminals.

8. A magnetic amplifier comprising first and second saturable core members each having a control winding and a load winding thereon, first alternating voltage supply means unilaterally coupled in phase opposition to the load windings of the cores to drive said cores to saturation in alternation in successive half cycles of the first voltage, a load circuit energized by the load windings, second alternating voltage supply means synchronous with the first supply means, current limiting means driven in inverse phase by the second alternating voltage supply means having output terminals, means unilaterally coupling the said output terminals to the control windings in phase opposition to demagnetize the cores in successive half cycles of the second voltage in opposed alternation to saturation thereof by the load windings, control means comprising a synchronous voltage source of variable amplitude and reversible phase coupled to the second voltage supply, a transformer having a center tap connected to the control means, and unilateral means connecting the transformer to said output terminals.

9. A magnetic amplifier comprising first and second saturable core members each having a control winding and a load winding thereon, first alternating voltage supply means unilaterally coupled in phase opposition to the load windings of the cores to drive said cores to saturation in alternation in successive half cycles of the first voltage, a load circuit energized by the load windings, second alternating voltage supply means synchronous with the first supply means, current limiting means driven in inverse phase by the second alternating voltage supply means having output terminals, means unilaterally coupling the said output terminals to the control windings in phase opposition to demagnetize the cores in successive half cycles of the second voltage in opposed alternation to saturation thereof by the load windings, control means comprising a synchronous voltage source of variable amplitude and reversible phase coupled to the second voltage supply, a transformer having a center tap connected to the control means, and unilateral means connecting the transformer to said output terminals, the said current limiting means operative to limit current flow to substantially the sum of half the magnetization current of the transformer and the magnetization current of one control winding.

References Cited in the file of this patent

UNITED STATES PATENTS

| | | |
|---|---|---|
| 2,677,796 | Geyger | May 4, 1954 |
| 2,683,843 | Geyger | July 13, 1954 |
| 2,683,845 | Geyger | July 13, 1954 |